(12) United States Patent
Haegermarck

(10) Patent No.: US 7,647,144 B2
(45) Date of Patent: Jan. 12, 2010

(54) OBSTACLE SENSING SYSTEM FOR AN AUTONOMOUS CLEANING APPARATUS

(75) Inventor: Anders Haegermarck, Trångsund (SE)

(73) Assignee: Aktiebolaget Electrolux, Stockholm (SE)

( * ) Notice: Subject to any disclaimer, the term of this patent is extended or adjusted under 35 U.S.C. 154(b) by 1137 days.

(21) Appl. No.: 10/469,069

(22) PCT Filed: Feb. 25, 2002

(86) PCT No.: PCT/SE02/00342

§ 371 (c)(1),
(2), (4) Date: Feb. 19, 2004

(87) PCT Pub. No.: WO02/067745

PCT Pub. Date: Sep. 6, 2002

(65) Prior Publication Data

US 2004/0143930 A1   Jul. 29, 2004

(30) Foreign Application Priority Data

Feb. 28, 2001  (SE) ................................... 0100677

(51) Int. Cl.
*G01C 22/00* (2006.01)

(52) U.S. Cl. .................. 701/23; 15/319; 15/320; 15/383; 15/340.1; 180/65.1; 180/167

(58) Field of Classification Search ............... 701/23; 15/358, 319–320, 340.1, 383; 180/65.1, 180/167

See application file for complete search history.

(56) References Cited

U.S. PATENT DOCUMENTS

| | | | |
|---|---|---|---|
| 2,770,074 A | * | 11/1956 | Jones et al. ................. 446/442 |
| 3,713,505 A | * | 1/1973 | Muller ......................... 180/401 |
| 4,588,041 A | * | 5/1986 | Tsuchihashi ................ 180/168 |
| 4,852,677 A | | 8/1989 | Okazaki |
| 4,887,415 A | * | 12/1989 | Martin ..................... 56/10.2 R |
| 5,156,038 A | | 10/1992 | Kozikaro |

(Continued)

FOREIGN PATENT DOCUMENTS

DE   10060208 A1 *  6/2002

(Continued)

OTHER PUBLICATIONS

Time Optimal Path Planning for Mobile Robots in Dynamic Environments; Dinham, M.; Gu Fang; Mechatronics and Automation, 2007. ICMA 2007. International Conference on; Aug. 5-8, 2007 pp. 2132-2137; Digital Object Identifier 10.1109/ICMA.2007.4303881.*

(Continued)

*Primary Examiner*—Cuong H Nguyen
(74) *Attorney, Agent, or Firm*—Pearne & Gordon LLP

(57) ABSTRACT

An obstacle-sensing system for carriers, particularly autonomous carriers such as robot vacuum cleaners, enables the carriers to disengage themselves from any obstacle or obstruction with which they come into physical contact and proceed past the obstacle or obstruction. The obstacle-sensing system is established by constructing a carrier to have front and rear sections which, normally, are in a neutral relationship with respect to one another but which move relative to one another when the front section physically engages an obstacle or obstruction. The relative movement activates a guidance and control system that maneuvers the carrier around the obstacle or obstruction.

36 Claims, 2 Drawing Sheets

U.S. PATENT DOCUMENTS

| | | | |
|---|---|---|---|
| 5,214,822 A * | 6/1993 | Sakurai et al. | 15/325 |
| 5,353,224 A | 10/1994 | Lee et al. | |
| 5,402,365 A | 3/1995 | Kozikaro et al. | |
| 5,440,216 A | 8/1995 | Kim | |
| 5,497,529 A * | 3/1996 | Boesi | 15/319 |
| 5,684,695 A | 11/1997 | Bauer | |
| 5,720,077 A | 2/1998 | Nakamura et al. | |
| 5,794,166 A | 8/1998 | Bauer et al. | |
| 5,815,880 A | 10/1998 | Nakanishi | |
| 5,867,800 A * | 2/1999 | Leif | 701/23 |
| 5,894,621 A * | 4/1999 | Kubo | 15/50.1 |
| 5,935,179 A * | 8/1999 | Kleiner et al. | 701/23 |
| 6,263,989 B1 * | 7/2001 | Won | 180/9.32 |
| 6,481,515 B1 * | 11/2002 | Kirkpatrick et al. | 180/65.1 |
| 6,611,738 B2 * | 8/2003 | Ruffner | 701/23 |
| 6,671,592 B1 * | 12/2003 | Bisset et al. | 701/23 |
| 6,758,837 B2 * | 7/2004 | Peclat et al. | 604/295 |
| 6,830,120 B1 * | 12/2004 | Yashima et al. | 180/167 |
| 6,883,201 B2 * | 4/2005 | Jones et al. | 15/319 |
| 6,901,090 B1 * | 5/2005 | Ohtsuki | 372/26 |
| 6,947,123 B1 * | 9/2005 | Ohtsuki | 355/67 |
| 7,136,402 B1 * | 11/2006 | Ohtsuki | 372/22 |
| 7,212,275 B2 * | 5/2007 | Ohtsuki | 355/67 |
| 7,388,343 B2 * | 6/2008 | Jones et al. | 318/587 |
| 7,444,206 B2 * | 10/2008 | Abramson et al. | 700/245 |
| 2004/0187249 A1 * | 9/2004 | Jones et al. | 15/319 |
| 2007/0293995 A1 * | 12/2007 | Sun et al. | 701/23 |
| 2008/0066257 A1 * | 3/2008 | Sun et al. | 15/319 |
| 2008/0281481 A1 * | 11/2008 | Abramson et al. | 701/23 |
| 2009/0038089 A1 * | 2/2009 | Landry et al. | 15/3 |
| 2009/0045766 A1 * | 2/2009 | Casey et al. | 318/568.16 |
| 2009/0055022 A1 * | 2/2009 | Casey et al. | 700/258 |

FOREIGN PATENT DOCUMENTS

| | | |
|---|---|---|
| EP | 0 803 224 A2 | 10/1997 |
| FR | 2685374 A1 * | 6/1993 |
| GB | 2398394 A * | 8/2004 |
| JP | 9-319435 | 12/1997 |
| JP | 2003190064 A * | 7/2003 |
| JP | 2007034768 A * | 2/2007 |
| JP | 2007143645 A * | 6/2007 |
| TW | 200814961 A * | 4/2008 |
| WO | WO 95/26512 | 5/1995 |
| WO | WO 97/40734 | 11/1997 |
| WO | WO 97/41451 | 11/1997 |
| WO | WO 99/40496 | 8/1999 |
| WO | WO 99/59402 | 11/1999 |
| WO | WO/00/10062 | 2/2000 |
| WO | WO 00/38025 | 6/2000 |
| WO | WO 00/38028 | 6/2000 |
| WO | WO 00/38029 | 6/2000 |
| WO | WO002067745 A1 * | 9/2002 |
| WO | WO 3003896 A1 * | 1/2003 |

OTHER PUBLICATIONS

Core technologies for service robotics; Karlsson, N.; Munich, M.E.; Goncalves, L.; Ostrowski, J.; Di Bernardo, E.; Pirjanian, P.; Intelligent Robots and Systems, 2004. (IROS 2004). Proceedings. 2004 IEEE/RSJ International Conference on; vol. 3, Sep. 28-Oct. 2, 2004 pp. 2979-2984 vol. 3; Digital Object Identifier 10.1109/IROS.2004.1389862.*

A robotic road sweeper; Prassler, E.; Schwammkrug, D.; Rohrmoser, B.; Schmidl, G.; Robotics and Automation, 2000. Proceedings. ICRA '00. IEEE International Conference on; vol. 3, Apr. 24-28, 2000 pp. 2364-2369 vol. 3 Digital Object Identifier 10.1109/ROBOT.2000.846380.*

MILO—mobile intelligent Linux robot, Rao, A.; Kumar, S.; Renu, A.; Nandi, G.C.; India Annual Conference, 2004. Proceedings of the IEEE INDICON 2004. First Dec. 20-22, 2004 pp. 205-209; Digital Object Identifier 10.1109/INDICO.2004.1497739.*

D.J. Balkcom, P.A. Kavathekar, and M.T. Mason, "Time-optimal trajectories for an omni-directional vehicle." The International Journal of Robotics Research 2006; 25; pp. 985-999.*

Z. Qu, J. Wang, and C.E. Plaisted, "A new analytical solution to mobile robot trajectory generation in the presence of moving obstacles." IEEE Transactions on Robotics. 2004, 20; pp. 978-993.*

E. Magid, and E. Rivlin, "CautiousBug: A competitive algorithm for sensory based robot navigation." Proceedings of the IEEE International;Conference on Intelligent Robots and Systems, Sendai, Japan, 2004, pp. 2757-2762.*

K. Kurihara, N. Nishiuchi, J. Hasegawa, and K. Masuda, "Mobile robots path planning method with the existence of moving obstacles." Proceedings of the 10th IEEE Conference on Emerging Technologies and Factory Automation. 2005. pp. 195-202.*

* cited by examiner

OBSTACLE SENSING SYSTEM FOR AN AUTONOMOUS CLEANING APPARATUS

FIELD OF THE INVENTION

The present invention relates to an obstacle-sensing system for carriers, particularly autonomous carriers. Should a carrier, as it traverses a surface, come into physical contact with an obstacle or obstruction, the obstacle-sensing system of the invention will react so that the carrier disengages itself from the obstacle or obstruction and maneuvers around it.

This obstacle-sensing capability is established by constructing a carrier of front and rear sections and means for normally supporting the two sections in a neutral relationship but which allows for their movement in relation to one another when the front section physically engages an obstacle or obstruction. The relative movement between the two sections results in the manipulation of an operational function of the carrier so that the carrier will disengage itself from the obstacle or obstruction and proceed past it, at which point the front and rear sections are returned to their neutral state. The invention can be effectively incorporated into autonomous cleaning devices such as robot vacuum cleaners.

BACKGROUND OF THE INVENTION

It is well-known to provide an autonomous carrier, such as a carrier for performing a conditioning operation on the surface over which it traverses, with sensing and guidance and control systems that allow the carrier to orient itself on the surface and carry out its functions while avoiding obstacles or obstructions. Such systems are commonly used with robot vacuum cleaners. Examples of these systems are disclosed in U.S. Pat. No. 5,935,179, WO9526512 and Patent Abstracts of Japan, abstract of JP 9-319435. However, obstacles will not be avoided in all instances and it is desirable that the carrier possesses an obstacle-sensing capability such that the carrier will free itself when it comes into physical contact with, or bumps into, an obstacle or obstruction. It is further desirable that the obstacle-sensing capability be sensitive to even slight contacts between the carrier and an obstacle, and not depend on a forceful engagement of the two.

SUMMARY OF THE INVENTION

The purpose of the present invention is to provide a carrier, particularly an autonomous carrier, which performs a surface-conditioning operation, with an obstacle-sensing capability so that the carrier, as it traverses a surface, will free itself of any obstacle or obstruction with which it comes into physical contact. In a specific application, the invention is applied to an autonomous cleaning apparatus, such as a robot vacuum cleaner, comprising a chassis having a housing including front and rear sections that are moveable in relation to one another and motive means consisting of at least two drive wheels or the like. Located within the housing are electric guidance and control and sensing systems for the vacuum cleaner. The front section acts as a "bumper," for the obstacle-sensing system of the invention. When the front section physically contacts an obstacle or obstruction, it will move in relation to the rear section and this movement is sensed and causes a control signal to propagate to the robot vacuum cleaner's guidance and control system. This results in the manipulation of an appropriate operational function of the vacuum cleaner so that it moves away from and passes by the obstacle or obstruction.

In accordance with one aspect, the present invention provides a carrier, including motive means, for traversing a surface wherein the carrier has front and rear sections. Means is included for normally supporting the front and rear sections in a neutral relationship but allowing for their movement in relation to one another when the front section comes into physical contact with an obstacle or obstruction. Control means is mounted to the rear section for controlling the operation of the carrier. Actuating means is mounted to the front section for activating the control means when the front and rear sections move in a predetermined direction in relation to one another.

In accordance with another aspect, the present invention provides a carrier as described above wherein the control means comprises more than one control unit and the actuating means comprises a corresponding number of actuating units. Each actuating unit is located so as to activate a respective control unit. The means for supporting the front and rear sections allows for both separate and coincidental activation of the control units by the actuating units.

In accordance with a further aspect, the present invention provides a carrier, including motive means, for traversing a surface. The carrier has front and rear sections and means for normally supporting those sections in a neutral relationship but allowing for their movement relative to one another when the front section comes into physical contact with an obstacle or obstruction. The supporting means includes a flexible coupling means having a cross-piece and two depending legs fixed to the cross-piece. The coupling means is rotatably attached to the rear section along the cross-piece and to the front section by the legs.

In accordance with a further aspect, the present invention provides a carrier as described above wherein the flexible coupling means is rotatably attached to the front section by the depending legs along an axis which defines the center of gravity for the front section when it is in its operative position with relation to the rear section.

In accordance with yet another aspect, the present invention provides carriers as described about wherein the carriers comprise autonomous cleaning devices such as robot vacuum cleaners.

The foregoing and other objects, features, aspects and advantages of the present invention will become more apparent from the detailed description thereof below, in relation to a preferred embodiment, when taken in conjunction with the accompanying drawings.

AN ILLUSTRATIVE PREFERRED EMBODIMENT

Figure 1:
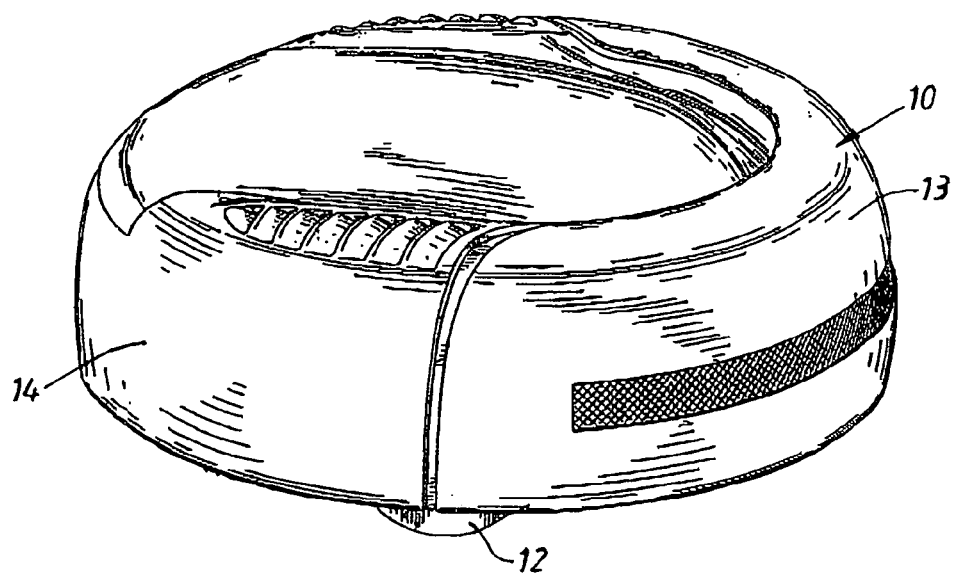
FIG. 1 is a perspective view of an autonomous vacuum cleaner utilizing the invention.
Figure 2:
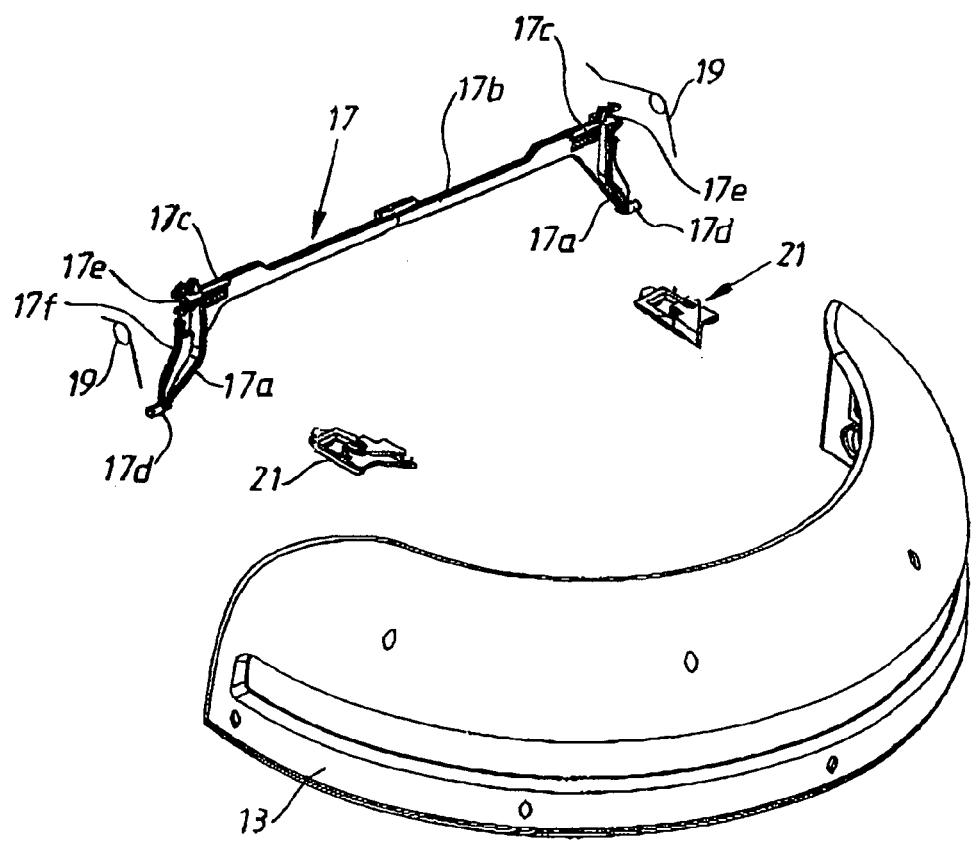
FIG. 2 is an exploded perspective view of the movable front section of the vacuum cleaner and the means for supporting the front section in relation to the rear section.

A carrier, in the form of an autonomous robot vacuum cleaner, is shown in FIG. 1, where the device would move to the right when moving in a forward direction. The robot vacuum cleaner comprises a chassis with a housing 10 and a bottom plate 11. The vacuum cleaner is guided and driven by motive means comprising two wheels 12 which, typically, are individually driven and arranged at each side of the housing.

The housing will typically enclose and carry a self-contained power source such as a battery or set of batteries and a pair of electric motors, not shown. The motors drive the wheels 12, with each motor driving a different wheel for example. Alternatively, a single motor might drive both drive wheels. The drive motor(s), or an additional dedicated motor, is used to drive a vacuum source or fan unit and a brush roll arranged in a nozzle (also not shown) directed towards the floor surface, to provide a vacuuming and sweeping function. The nozzle is connected to the vacuum source via a filter arrangement (for example, a dust bag or filter, or some other type of separation system such as a cyclone separator). The housing also encloses and carries an electrical means for controlling the operation of the vacuum cleaner, the electrical means including an electrical guidance and control system (perhaps utilizing a controller or microprocessor for computation functionality) and an obstacle and/or obstruction sensing system intended to detect obstacles and obstructions before they are physically engaged so that they may be avoided in most cases. Such systems are known in the prior art and are not described here.

In the illustrated embodiment, the housing 10 comprises a front section 13 and a rear section 14. The front section 13 is movably arranged with respect to the bottom plate 11, whereas the rear section 14 is fixed to the bottom plate so that the two sections may move in relation to one another. The surface of the front section is curved in both vertical and horizontal directions and is in sliding contact with rear section 14 at several points. The front section acts as a bumper with the ability to sense obstacles and obstructions in the path of the robot vacuum cleaner by coming into contact or bumping into them. As a result of such contact, the front and rear sections will move in relation to one another. This movement activates a control means for the robot vacuum cleaner, as further described below, so that the cleaner can disengage itself from the obstacles and/or obstructions and maneuver around them. Although the front and rear sections are distinct from one another, they both incorporate an overall cylindrical shape such that the vacuum cleaner has a uniform, mostly continuous, pleasing shape.

As will now be described, means is provided for the vacuum cleaner for normally supporting the front and rear sections in a neutral relationship but allowing for their movement relative to one another when the front section comes into physical contact with an obstacle or obstruction. Thus, the rear section 14 has mounted at its front a bracket 15 having several fixed, dependent elements such as hooks 16, for example, placed along a horizontal axis perpendicular to the direction of movement of the vacuum cleaner. These dependent elements support a coupling means or rocker arm arrangement. The rocker arm arrangement may be designed as a U-shaped yoke 17 having two depending legs 17a fixed to a cross-piece 17b. The cross-piece 17b has several slots 17c, the number of which corresponds to the number of hooks 16, and through which the hooks 16 are inserted. The hooks 16 and slots 17c, where they engage one another, have complimentarily curved surfaces so that the yoke 17 is rotatably or tiltably supported from the hooks 16. Each leg 17a is provided with a dowel 17d at its lower end. Each dowel is turnably and/or rotatably supported in a recess in a bracket 18 that is fastened to the front section 13. The recesses, preferably, are located along an axis that defines, essentially, the center of gravity for the front section 13 when it is in its operative position with relation to the rear section 14. The yoke, also, is provided with two spring supports 17e located near the point at which each leg is attached to the yoke. Each spring support 17e supports a spring 19 which can, for example, comprise a coil-shaped wire. Each spring 19 has extended ends, one end resting against a shoulder 17f on a leg 17a and the other end resting against a stop means 20 arranged on bracket 15. The springs 19 are tensioned in such a way that they urge the lower part of the yoke 17, and hence the front section 13, in the forward direction, i.e., to the left in FIG. 3.

The front section 13 also supports actuating means in the form of two actuating units 21 which are in contact with a control or switching means having microswitches 23. Movement of the front section 13 in relation to the rear section 14 causes the actuating means to activate the control means 23, resulting in the manipulation of an operational function of the robot vacuum cleaner so that, upon coming in physical contact with an obstacle or obstruction, it can disengage itself and pass by the obstacle or obstruction. For example, in the illustrated embodiment, the two actuating units 21 (which can be designed as plates, for example) have openings that are engaged with a sliding surface 22 at the front of the bottom plate 11. Each opening is provided with a front- and a rear-limiting edge 21a and 21b, respectively. For the illustrated embodiment, the switching means can be implemented, for example, by having the actuating units 21 connected to the switching means in a manner that the openings in each actuating unit 21 surround a respective microswitch, whereby an operating knob 23a for each microswitch normally is depressed by means of the rear-limiting edge 21b of a corresponding opening in a respective actuating unit 21. The microswitches can be arranged on a circuit board 24 that is supported by means of a plate 25 connected to the bottom plate 11. The two microswitches in the illustrated embodiment are connected to the electric circuit of the vacuum cleaner. Because each rear-limiting edge 21b, in its normal position, keeps a respective operating knob 23a of the microswitch in its depressed position, small movements of the front section 13 in relation to rear section 14, as occur when the front section comes into physical contact with obstacles or obstructions, will establish an electrical signal, thereby affecting the electric circuit and/or control circuit or microprocessor controlling the operation of the robot vacuum cleaner. It is within the scope of the invention, if desired, to replace the microswitches with other types of position detectors.

The robot vacuum cleaner operates in the following manner: When the vacuum cleaner has been activated and placed on a surface, such as a floor surface to be cleaned and/or vacuumed, it is guided by means of an electric circuit and/or a control circuit or microprocessor. This electric circuit also includes means for sensing the surroundings and/or for detecting the position of the vacuum cleaner in the room without physically touching the surroundings or an object in the room. The guiding and driving of the robot vacuum cleaner is accomplished by means of the drive wheels 12. The circular or cylindrical shape of the vacuum cleaner enables it to be turned through 180 degrees while minimizing any risk of it being hindered in its movement and/or stuck in a trapped position.

Figure 3:
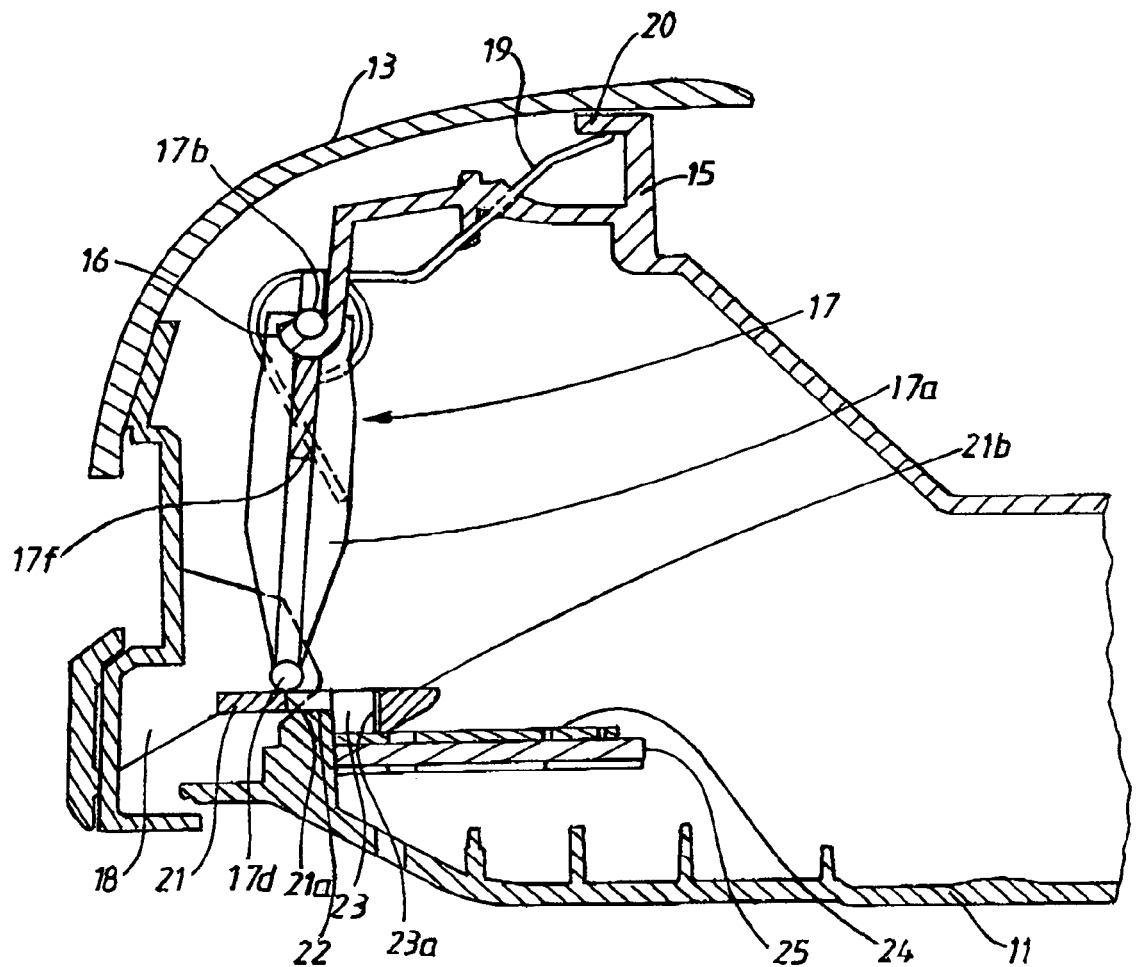
FIG. 3 is a vertical section through the front and a portion of the rear sections of the vacuum cleaner.

Normally the front and rear sections of the vacuum cleaner are supported in a neutral relationship. However, when the movable front section 13 of the vacuum cleaner physically contacts an obstacle or obstruction, it will be moved rearwards with respect to the bottom plate 11 and the rear section 14. This movement causes the yoke 17 to rotate or tilt counterclockwise, as the yoke is illustrated in FIG. 3, about its support points, i.e., where the hooks 16 and slots 17c are engaged. The rotation of the yoke occurs against the action of the spring 19. At the same time, the rearward motion of front section 13 causes the arms 21 to move rearwardly with respect to the bottom plate 11 and the circuit board 24. This movement activates one or both of the microswitches, causing a signal to be transmitted to the electric circuit controlling the operation of the vacuum cleaner and shutting off the drive motors. The controller or microprocessor, then, causes the vacuum cleaner to turn such that it frees itself or is released from the obstacle or obstruction and can maneuver around it. As the vacuum clean comes free, the movable front section 13 returns to its neutral position with relation to rear section 14 under the urging of the springs 19.

The cross-piece or yoke 17 is preferably designed such that it is sufficiently flexible to allow the two legs 17a to work either together or, more or less, independently of one another. Thus, both separate and coincidental activation of the control units by the actuating units is possible. As a result of their ability to act independently, if an obstacle or obstruction is located such that the front section 13 physically contacts the obstacle or obstruction at a location nearer to one or the other legs 17a and actuating units 21, that unit will be the first to activate a microswitch. By measuring the time difference between the activation of each of the two microswitches, it is possible for the electronic circuit of the vacuum cleaner guidance system to calculate the approximate position of the obstacle or obstruction contacted with respect to the vacuum cleaner and adapt its driving and guiding movements with respect to that particular obstacle or obstruction, improving the ability of the robot vacuum cleaner to disengage itself and continue its vacuuming function.

By means of the invention, as described above, an efficient obstacle-sensing system for a carrier, which has a high degree of sensitivity and gives a distinct reaction when contacting an obstacle or obstruction, is achieved. These desirable results are attained by means of a design for the obstacle sensing system that minimizes friction influences, and places the microswitches for controlling the operation of the carrier in a manner such that the operating knobs of the microswitches, normally, are in their depressed position, thereby providing an immediate reaction when an obstacle is physically contacted.

It will be understood by those skilled in the art that various modifications and changes may be made to the present invention without departure from the spirit and scope thereof as defined in the appended claims.

The invention claimed is:

1. A carrier, including motive means, for traversing a surface, the carrier having a front section and a rear section arranged movably in relation to each other, means for normally supporting the front and rear sections in a neutral relationship in which the front and rear sections are in initial relative positions spaced away from each other but allowing for their movement in relation to one another when the front section comes into physical contact with an obstacle, control means for controlling the operation of the carrier and actuating means for activating the control means when the front and rear sections move in relation to one another.

2. The carrier of claim 1 including surface-conditioning means mounted on the carrier for conditioning the surface over which the carrier traverses.

3. The carrier of claim 2 wherein the surface-conditioning means comprises elements for vacuuming the surface over which the carrier traverses.

4. The carrier of claim 3 including self-contained power means for driving the motive means such that the carrier may traverse a surface autonomously.

5. The carrier of claim 4 wherein the motive means comprises wheels.

6. The carrier of claim 1 wherein the control means comprises more than one control unit and the actuating means comprises a corresponding number of actuating units, each actuating unit being located so as to activate a respective control unit, the supporting means allowing for both separate and coincidental activation of the control units by the actuating units.

7. The carrier of claim 6 including surface-conditioning means mounted on said carrier for conditioning the surface over which the carrier traverses.

8. The carrier of claim 7 wherein the surface-conditioning means comprises elements for vacuuming the surface over which the carrier traverses.

9. The carrier of claim 8 including self-contained power means for driving the motive means such that the carrier may traverse a surface autonomously.

10. The carrier of claim 9 wherein the motive means comprises wheels.

11. The carrier of claim 1 wherein the supporting means includes a flexible coupling means having a cross-piece and two depending legs fixed to the cross-piece, the coupling means being rotatably attached to the rear section along the cross-piece and to the front section by the legs.

12. The carrier of claim 11 wherein the supporting means includes means for continually urging the front section in one direction in relation to the rear section.

13. The carrier of claim 12 wherein the urging means comprises a spring.

14. The carrier of claim 13 wherein the surface-conditioning means comprises elements for vacuuming the surface over which the carrier traverses and the carrier includes self-contained power means for driving the motive means such that the carrier traverses the surface autonomously.

15. The carrier of claim 11 wherein the coupling means is rotatably attached to the front section by the depending legs along an axis which defines the center of gravity for the front section when it is in its operative position with relation to the rear section.

16. The carrier of claim 15 wherein the supporting means includes means for continually urging the front section in one direction in relation to the rear section.

17. The carrier of claim 16 wherein the urging means comprises a spring.

18. The carrier of claim 17 wherein the surface-conditioning means comprises elements for vacuuming the surface over which the carrier traverses and the carrier includes self-contained power means for driving the motive means such that the carrier traverses the surface autonomously.

19. A carrier, including motive means, for traversing a surface, the carrier including a front section and a rear section, means for normally supporting the front and rear sections in a neutral relationship in which the front and rear sections are in initial relative positions spaced away from each other but allowing for their movement relative to one another when the front section comes into physical contact with an obstacle, the supporting means including a flexible coupling means having a cross-piece and two depending legs fixed to the cross-piece, the coupling means being rotatably attached to the rear section along the cross-piece and to the front section by the legs.

20. The carrier of claim 19 including surface-conditioning means mounted on the carrier for conditioning the surface over which the carrier traverses.

21. The carrier of claim 20 wherein the surface-conditioning means comprises elements for vacuuming the surface over which the carrier traverses.

22. The carrier of claim 21 including self-contained power means for driving the motive means such that the carrier may traverse a surface autonomously.

23. The carrier of claim 22 wherein the motive means comprises wheels.

24. The carrier of claim 19 wherein the supporting means includes means for continually urging the front section in one direction in relation to the rear section.

25. The carrier of claim 24 wherein the urging means comprises a spring.

26. The carrier of claim 25 wherein the surface-conditioning means comprises elements for vacuuming the surface over which the carrier traverses and the carrier includes self-contained power means for driving the motive means such that the carrier traverses the surface autonomously.

27. The carrier of claim 19 wherein the coupling means is rotatably attached to the front section by the depending legs along an axis which defines the center of gravity for the front section when it is in its operative position with relation to the rear section.

28. The carrier of claim 27 wherein the supporting means includes means for continually urging the front section in one direction in relation to the rear section.

29. The carrier of claim 28 wherein the urging means comprises a spring.

30. The carrier of claim 29 wherein the surface-conditioning means comprises elements for vacuuming the surface over which the carrier traverses and the carrier includes self-contained power means for driving the motive means such that the carrier traverses the surface autonomously.

31. A carrier, including motive means for moving the carrier, for traversing a surface, the carrier having a front section and a rear section, structure of the carrier movably supports the front section and the rear section with the structure being constructed and connected to support in a neutral relationship in which the front and rear sections are in initial relative positions spaced away from each other and to permit relative movement between the front section and the rear section from the neutral relationship when the front section comes into physical contact with an obstacle, a control device that controls operation of the carrier including controlling the motive means, and an actuating device that activates the control device when the front and rear sections move from the neutral relationship because of the physical contract with the obstacle.

32. The carrier of claim 31 including elements for vacuuming the surface over which the carrier traverses.

33. The carrier of claim 31 wherein the structure of the carrier that movably supports the front section on the rear section includes a flexible coupling having a cross-piece and two depending legs fixed to the cross-piece, the coupling being rotatably attached to the rear section along the cross-piece and to the front section by the legs.

34. The carrier of claim 33 wherein the structure of the carrier that movably supports the front section on the rear section includes a spring that continually urges the front section in one direction in relation to the rear section.

35. The carrier of claim 33 wherein the coupling is rotatably attached to the front section by the legs along an axis which defines the center of gravity for the front section when it is in its operative position with relation to the rear section.

36. The carrier of claim 1 wherein the means for normally supporting but allowing movement includes a flexible coupling having a cross-piece and two depending legs fixed to the cross-piece, the coupling being rotatably attached to the rear section along the cross-piece and to the front section by the legs.

* * * * *

UNITED STATES PATENT AND TRADEMARK OFFICE
CERTIFICATE OF CORRECTION

PATENT NO.       : 7,647,144 B2                                          Page 1 of 1
APPLICATION NO.  : 10/469069
DATED            : January 12, 2010
INVENTOR(S)      : Anders Haegermarck It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1638 days.

Signed and Sealed this

Sixteenth Day of November, 2010

David J. Kappos
*Director of the United States Patent and Trademark Office*